US008581508B2

(12) United States Patent
Horino

(10) Patent No.: US 8,581,508 B2
(45) Date of Patent: Nov. 12, 2013

(54) LED DRIVING APPARATUS

(75) Inventor: Mamoru Horino, Gyunggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 242 days.

(21) Appl. No.: 13/240,825

(22) Filed: Sep. 22, 2011

(65) Prior Publication Data

US 2012/0126713 A1 May 24, 2012

(30) Foreign Application Priority Data

Nov. 24, 2010 (KR) .......................... 10-2010-0117749

(51) Int. Cl.
*H05B 41/16* (2006.01)

(52) U.S. Cl.
USPC ........ 315/247; 315/185 S; 315/307; 315/291; 315/312

(58) Field of Classification Search
USPC ............... 315/247, 224, 185 S, 291, 307–326
See application file for complete search history.

(56) References Cited

U.S. PATENT DOCUMENTS

| 7,511,437 | B2 | 3/2009 | Lys et al. | |
|---|---|---|---|---|
| 8,148,919 | B2* | 4/2012 | Liu et al. | 315/307 |
| 2008/0203932 | A1 | 8/2008 | Ball | |
| 2010/0259181 | A1 | 10/2010 | Fujimura et al. | |
| 2012/0032613 | A1* | 2/2012 | Liu et al. | 315/297 |
| 2012/0104970 | A1* | 5/2012 | Okubo et al. | 315/291 |

FOREIGN PATENT DOCUMENTS

| EP | 2 249 620 A1 | 11/2010 |
|---|---|---|
| WO | WO 2009/138478 A2 | 11/2009 |

OTHER PUBLICATIONS

Extended European Search Report, issued in European Patent Application No. 11 181 318.4, dated Nov. 25, 2011.
European Examination Report issued in European Patent Application No. EP 11 181 318.4 dated Serptember 24, 2012.

* cited by examiner

*Primary Examiner* — Tuyet Thi Vo
(74) *Attorney, Agent, or Firm* — McDermott Will & Emery LLP

(57) ABSTRACT

Provided is an LED driving apparatus capable of improving a power factor through a non-insulation type simplified circuit structure, including: a light emitting unit having at least one LED; a rectifier rectifying an alternate current (AC) voltage applied from external power; a power supply unit supplying driving power to the light emitting unit, and having an inductor connected to an output terminal of the light emitting unit; and a switch controller.

8 Claims, 8 Drawing Sheets

LED DRIVING APPARATUS

CROSS-REFERENCE TO RELATED APPLICATIONS

This application claims the priority of Korean Patent Application No. 10-2010-0117749 filed on Nov. 24, 2010, in the Korean Intellectual Property Office, the disclosure of which is incorporated herein by reference.

BACKGROUND OF THE INVENTION

1. Field of the Invention

The present invention relates to an LED driving apparatus of a non-insulation type step down AC-DC converter able to correspond to a triac dimmer and improve a power factor.

2. Description of the Related Art

Alight emitting device (LED) is a semiconductor device for implementing light of various kinds of colors by varying materials of a compound semiconductor such as GaAs, AlGaAs, GaN, InGaInP, or the like to constitute a light emitting source. The light emitting device has a prominent single-color peak wavelength and light efficiency, facilitates miniaturization, and is also widely used in various fields, for example, in TVs, computers, general illumination devices, automobiles and the like, due to environmental-friendliness and low-power consumption characteristics and the like. A field of use therefor is gradually being widened.

In order to drive LED modules, an AC-DC converter converting an input alternating current (AC) voltage into a direct current (DC) voltage is connected to a DC-DC converter converting the converted DC voltage into a current to drive the LED module and supplying the converted voltage. For example, there may be a buck converter used when an input voltage is greater than an LED voltage, a boost converter when an input voltage has a level lower than that of an LED voltage, a buck-boost converter used in a status in which an input voltage may be varied from more than the LED voltage to a level lower thereof, or the like.

As an LED driving circuit for improving a power factor with comparatively low expenses, there may be a PFC flyback method according to the related art. However, the flyback method requires a photo coupler transferring LED current information from a primary side to a secondary side, and a transformer supplying power from a primary side to a secondary side. In this case, circuit miniaturization is difficult to implement.

Furthermore, since in a power factor correcting circuit according to the related art, a feedback band is set to be 10 to 20 Hz so as not to respond to a frequency change of 100 to 120 Hz in order to supply a predetermined amount of current, a response is relatively very slow, which becomes a factor not to facilitate to correspond to a triac dimmer. In the power factor correcting circuit according to the related art, it is general to supply power through a bleeder resistor from a voltage provided after commercial power is rectified by applying a bridge diode thereto in driving a circuit. In this case, when brightness is lowered by the triac dimmer, overall voltage is also lowered, therefore flickering may occur and a relatively long time may be taken to turn an LED device on or off or it may not light up at all. In addition, since standard components the transformer exist, developmental expenses and much time are required.

SUMMARY OF THE INVENTION

An aspect of the present invention provides an LED driving apparatus capable of improving a power factor through a non-insulation type simplified circuit structure, being adaptable to a triac dimmer, being miniaturized to be economical.

According to an aspect of the present invention, there is provided an light emitting device (LED) driving apparatus including: a light emitting unit having at least one LED; a rectifier rectifying an alternate current (AC) voltage applied from external power; a power supply unit supplying driving power to the light emitting unit, and having an inductor connected to an output terminal of the light emitting unit; a switch controller receiving a voltage outputted from the rectifier to generate a reference voltage in proportion to the voltage outputted from the rectifier, and comparing the reference voltage with an input voltage generated by detecting a current flowing in the inductor, and controlling an on or off operation of a switch so as to proportion a waveform connecting peaks of the current flowing in the inductor to a waveform represented from the input voltage by turning the switch off at a point of time at which the voltages coincide with each other; and a switch connected to the switch controller to control power inputted from the light emitting unit.

According to an embodiment of the present invention, the switch controller may include a plurality of resistors connected in series to an output terminal of the rectifier and generate the reference voltage voltage-divided by the plurality of resistors.

In this case, the LED driving apparatus may further include a multilayer ceramic capacitor (MLCC) or film capacitor connected to the output terminal of the rectifier and connected in parallel with the plurality of resistors, substitute for Alumi. Electrolytic capacitors.

According to an embodiment of the present invention, the power supply unit may include a diode, an inductor and a capacitor.

In this case, the LED driving apparatus may further include a current detector connected in series to the switch, and the current detector may detect the current flowing in the inductor to generate an input signal of the switch control unit, during switch ON.

The current detector may include a resistor of which one end is connected to the switch and another end is connected to a negative side of the rectifier.

According to an embodiment of the present invention, wherein the switch controller may further include a Zener diode connected to an input terminal of the reference voltage.

According to an embodiment of the present invention, the light emitting unit may include a plurality of LEDs, and the plurality of LEDs may have at least one electrical connection structure of a serial connection, a parallel connection and a mixed type connection thereof.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
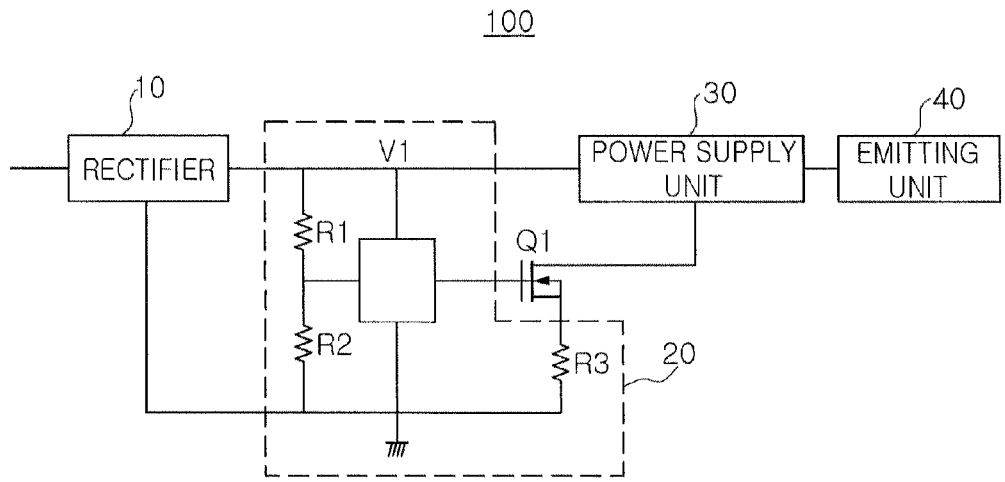
FIG. 1 is a block diagram of an LED driving device according to an embodiment of the present invention.

Embodiments of the present invention will now be described in detail with reference to the accompanying drawings such that they could be easily practiced by those having skill in the art to which the present invention pertains. However, in describing the embodiments of the present invention, detailed descriptions of well-known functions or constructions will be omitted so as not to obscure the description of the present invention with unnecessary detail.

In addition, like reference numerals denote like elements throughout the drawings.

Unless explicitly described to the contrary, the word "comprise" and variations such as "comprises" or "comprising," will be understood to imply the inclusion of stated elements but not the exclusion of any other elements.

Figure 2:
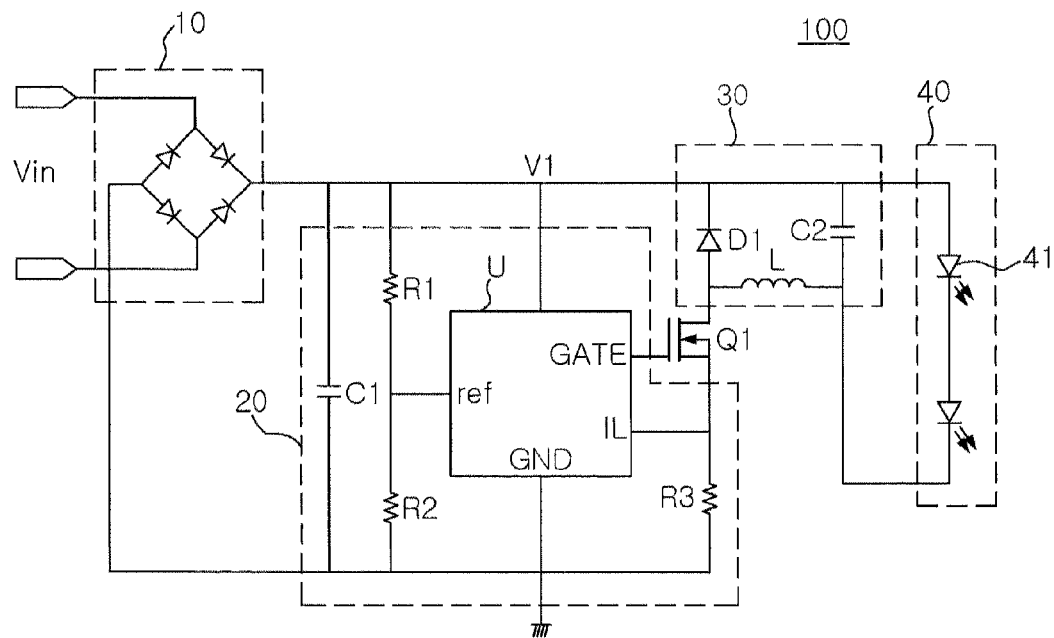
FIG. 2 is a circuit diagram of an LED driving device according to an embodiment of the present invention.

FIG. 1 is a block diagram of an LED driving apparatus according to an embodiment of the present invention. FIG. 2 is a circuit diagram of an LED driving apparatus according to an embodiment of the present invention. Referring to FIGS. 1 and 2, the LED driving apparatus may include a rectifier 10 of which one end is connected to alternate current (AC) power supplied from the outside and another end is connected to a switch controller 20, a switch controller 20 receiving rectified voltage from the rectifier 10, a switch Q1 connected to the switch controller 20 and controlled in an operation thereof, a supply unit 30 connected to the switch Q1, and a light emitting unit 40 receiving power to drive a plurality of LEDs 41 from the power supply unit 30 and discharging light. Herein, the switch controller 20 may include a control circuit U for comparing an input voltage from a third resistor R3 with a reference voltage and outputting a control signal. In addition, as shown in FIG. 2, the switch controller 20 may further include a small-capacity capacitor C1 such as a multilayer ceramic capacitor (MLCC) or film capacitor, installed at a rear portion of the rectifier 10 and connected in parallel to the switch controller 20, substitute for the Alumi. Electrolytic capacitors.

One end of the rectifier 10 may be connected to an external power Vin and another end thereof may be connected to the switch controller 20. The external power Vin, for example 120 VAC, may be commercial AC Line voltage, and when a bridge diode is applied to the rectifier 10 as shown in FIG. 2, an input AC voltage may be outputted as a full wave rectified voltage V1. The voltage V1 rectified in the rectifier 10 may be inputted to the switch controller 20 to control the switch Q1 through the switch controller 20 and supply an appropriate current to the light emitting unit 40.

The power supply unit 30, of which one end is connected to the switch Q1 and another end is connected to the light emitting unit 40, may be controlled by the switch Q1 so as to supply an output current to the light emitting unit 40. The power supply unit 30 may include a diode D1, an inductor L and a capacitor C2, and may have the same structure as a buck converter.

The light emitting unit 40 connected in parallel with the capacitor C2 constituting the power supply unit 30 may be a light source including at least one LED, and may include a plurality of LEDs having various electrical connectivity relationships. In FIG. 2, the plurality of LEDs constituting the light emitting unit 40 are shown in a serially connected state, but the plurality of LEDs included in the light emitting unit 40 may also be electrically connected by a serial connection or parallel connection or mixed type connection structure of serial and parallel connection according to the application in which the LED is applied.

The switch controller 20, of which one end is connected to an output terminal of the rectifier 10 and another end is connected to the switch Q1, may control current inputted to the light emitting unit 40 through the switch Q1. The control circuit U of the switch controller 20 may receive a reference voltage Vref provided by dividing a voltage converted in the rectifier 10. With reference to FIG. 1, the reference voltage Vref may be generated by dividing the full wave rectified voltage V1 by using first and second resistors R1 and R2. The control circuit U of the switch controller 20 may compare the generated reference voltage Vref with a voltage $I_L \times R3$ measured through current flowing an inductor L and output the compared result through a gate thereof, thereby controlling the switch Q1 to be turned off.

Figure 3:
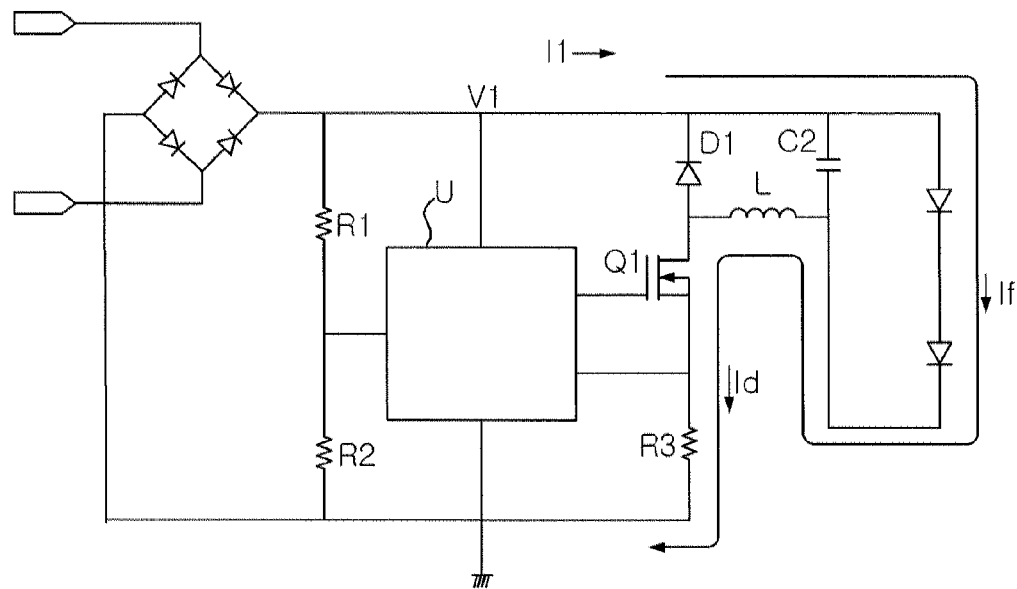
FIG. 3 illustrates a current flow when a switch of an LED driving apparatus is turned on according to an embodiment of the present invention.
Figure 4:
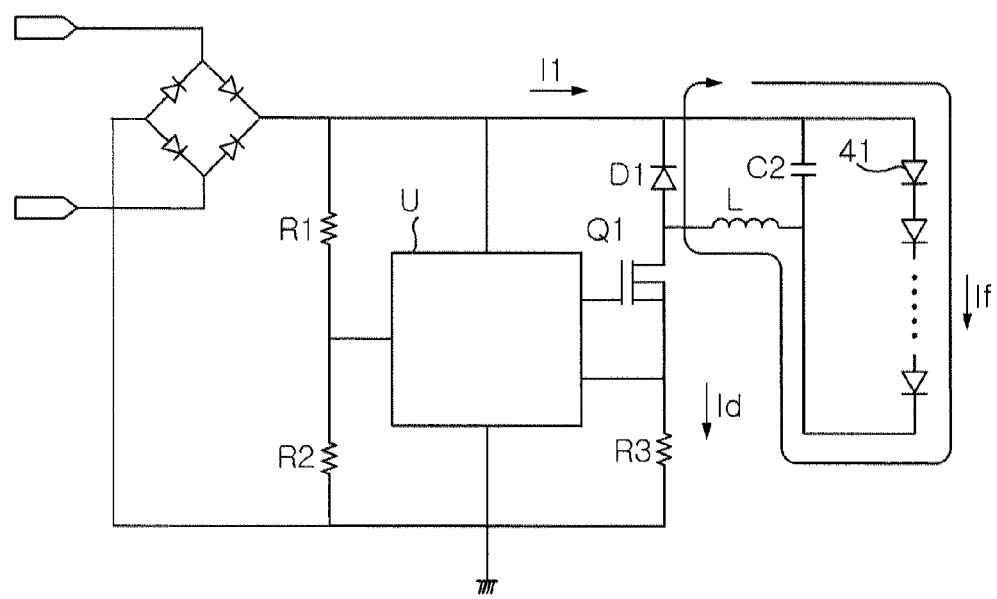
FIG. 4 illustrates a current flow when a switch of an LED driving apparatus is turned off according to an embodiment of the present invention.

FIG. 3 illustrates a current flow when a switch of the LED driving apparatus is turned on according to an embodiment of the present invention, and FIG. 4 illustrates a current flow when the switch of the LED driving apparatus is turned off according to an embodiment of the present invention. Referring to FIG. 3, when the switch is turned on, a current I1 flowing toward the light emitting unit 40 sequentially passes through the light emitting unit 40, the inductor L constituting the power supply unit 30, and the switch Q1 by using the voltage V1 rectified in the rectifier 10. Herein, when current passing through the light emitting unit 40 is indicated as $I_f$ and current passing through the inductor L and the switch Q1 is indicated as $I_d$, the current $I_1$ from the rectified voltage V1 has a value equal to that of $I_d$. That is, when the switch is turned on, it may satisfy '$I_1 = I_d$'.

'If' may represent a waveform provided by smoothing current flowing in the inductor L using C2. From an average value, the current $I_d$ flowing in the inductor L is the same as $I_f$. Since a switching frequency is, for example, 100 kHz, a relatively high frequency, a capacitor C2 may smooth $I_f$ by a relatively small capacity. Therefore, a small-capacity MLCC may be applied according to the embodiment of the present invention. Meanwhile, a 120 Hz (or 100 Hz) component is not smoothed, but remains as a ripple component of $I_f$. As the LED driving apparatus according to the embodiment of the present invention does not require an aluminum electrolytic capacitor, the lifespan of the LED driving apparatus may be prolonged.

Subsequently, with reference to FIG. 4, when the switch Q1 is temporarily turned off, current $I_f$ flows in the power supply unit 30 and the light emitting unit 40 by a supply unit of self power stored in the inductor L adapted in the power supply unit 30 in an on state of the switch Q1. That is, as indicated by the arrow in FIG. 4, the current $I_f$ flowing through the plurality of LEDs 41 constituting the light emitting unit 40 passes through the inductor L and the diode D1 of the power supply unit 30. At this time, the level of all of currents flowing through $I_1$ and $I_d$ becomes 0. That is, as shown in FIGS. 3 and 4, it can be seen that the current $I_1$ flowing toward the light emitting unit 40 by the voltage V1 outputted from the rectifier 10 has the same magnitude as that of the current $I_d$ flowing through the switch Q1, regardless of an on or off state of the switch ($I_1=I_d$).

Figure 5:
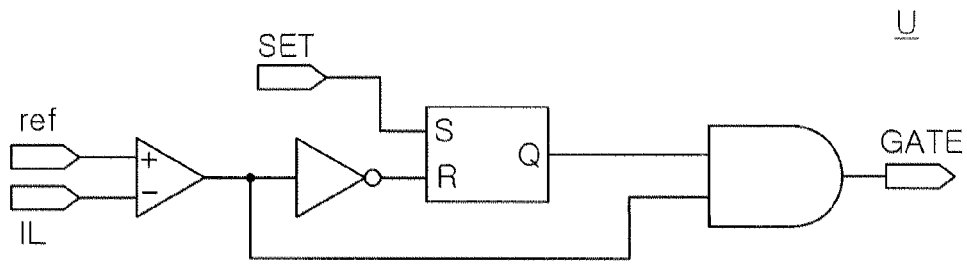
FIG. 5 illustrates a control circuit adapted in a switch controller according to an embodiment of the present invention.

FIG. 5 illustrates a control circuit U adapted inside a switch controller 20 according to an embodiment of the present invention. Referring to FIG. 5, the control circuit U may compare the reference voltage $V_{ref}$ obtained using the voltage V1 outputted from the rectifier 10 with voltage $V_{IL}$, held on both ends of the third resistor R3, and when the reference voltage $V_{ref}$ has a level higher than that of the voltage $V_{IL}$, held on the third resistor R3, a gate thereof may have a high level to turn the switch Q1 on, and when the reference voltage $V_{ref}$ has a level lower than or equal to that of the voltage $V_{IL}$ held on the third resistor R3, the gate thereof may maintain a low level L until a next set signal SET attains a high level, such that the switch Q1 is turned off. At this time, the reference voltage $V_{ref}$ may be decided from the voltage V1 outputted from the rectifier 10.

With reference to FIG. 3, the voltage V1 outputted from the rectifier 10 is divided by the first and second resistors R1 and R2 to be inputted to the control circuit U, and since the first and second resistors R1 and R2 are connected in series to each other, a value of the reference voltage $V_{ref}$ may satisfy an equation $$Vref = \frac{R2}{R1+R2}V1.$$

Therefore, a waveform of the reference voltage $V_{ref}$ may be weakened in the magnitude thereof and have an analog waveform similar to a waveform of the output voltage V1 rectified in the rectifier 10. However, FIG. 5 is a logic circuit diagram of control circuit U according to an embodiment of the present invention, and a logic circuit inside the control circuit U may be diversely varied.

Figure 6:
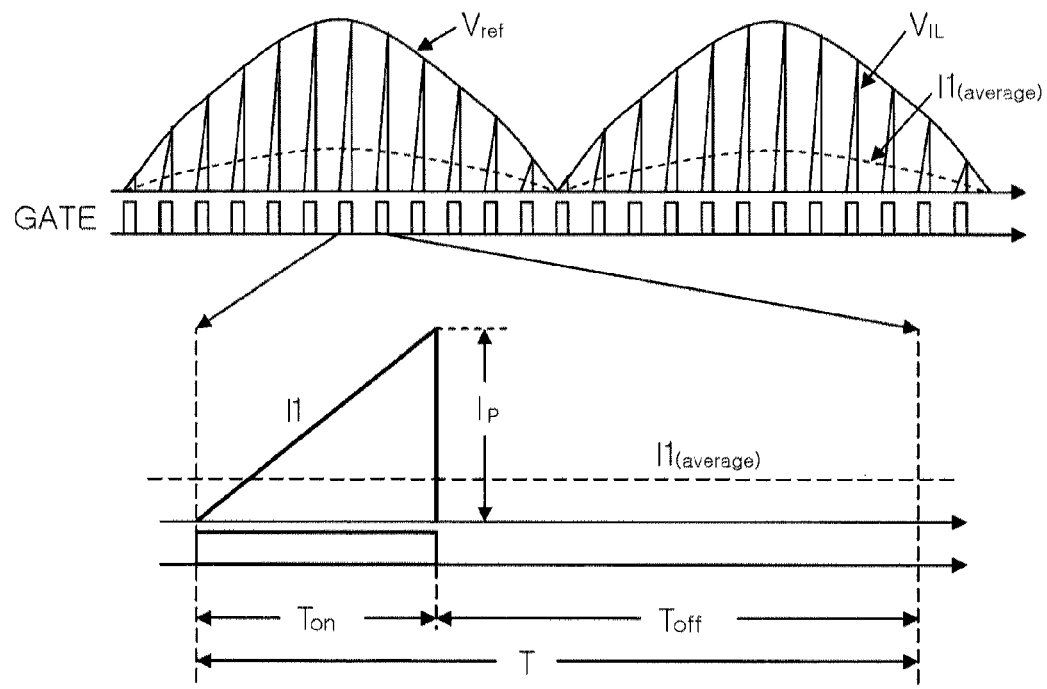
FIG. 6 illustrates I1 (=Id) a gate waveform and a voltage waveform inputted to a control circuit of a switch controller according to an embodiment of the present invention.

FIG. 6 illustrates a voltage waveform inputted to the control circuit U of the switch controller 20 according to an embodiment of the present invention. With reference to the drawing shown in an upper part of FIG. 6, as described above, the reference voltage $V_{ref}$ inputted to the control circuit U may have the same type of waveform as that of the full wave rectified voltage V1 and outputted from the rectifier 10, and a peak of another input voltage $V_{IL}$, of the control circuit U which is controlled by the switch Q1 and generates an output only in an on-state of the switch may also have a similar waveform thereto. At this time, the current I1 flowing from the rectifier 10 toward the power supply unit 30 may have the same magnitude as that of the current Id passing through the switch (I1=Id), and may satisfy $$I_d = \frac{V_{IL}}{R3},$$

therefore, I1 is in proportion to $V_{IL}$. That is, a waveform connecting the peaks of I1 may also be of a similar type to Vref and V1. The drawing shown in a lower part of FIG. 6 is a partially enlarged view of a waveform $V_{IL}$. Herein, since I1 is in proportion to $V_{IL}$, waveform shown in the lower part of FIG. 6 is here indicated as a waveform of I1.

Referring to the waveform shown in the lower part of FIG. 6, for example, when the length of time for which the switch Q1 controlled through the control circuit U is turned on is indicated as Ton, and when the length of time for which the switch Q1 is turned off is indicated as Toff, it may be Toff=k*Ton (k=constant). Herein, when an average of I1 is obtained, an I1 value exists for Ton time only among T time, and the average value of I1 for Ton becomes ½ of Ip as a peak current, therefore the average value of I1 may satisfy $$I1 = \frac{I_p}{2}\frac{T_{on}}{T} = \frac{T_{on}}{2(T_{on}+T_{off})}I_p = \frac{T_{on}}{2(T_{on}+kT_{on})}I_p = \frac{1}{2(1+k)}I_p.$$

Therefore, it can be known that the average of I1 is in proportion to Ip. That is, the average value of I1 may also represent a waveform similar to Ip by controlling time of Toff so as to become Toff=k*Ton.

According to the embodiment of the present invention, Ton is not a decided value, but may be decided by current flowing through the inductor L constituting the power supply unit 30. Toff may be decided by various methods. For example, when a switch is used or a current source is used, or when voltage Vf held on the light emitting unit 40 has a level much lower than a peak of voltage V1 rectified in the rectifier 10; even when Toff is controlled by a predetermined time through an independent adjusting using an external resistor, the approximately same effect can be obtained, thereby improving a power factor.

Described in detail, since a relatively small quantity of film capacitor or MLCC is set on a rear portion of the rectifier 10, the voltage V1 rectified by the rectifier 10 may be approximately equivalent to the full wave rectified waveform. A buck converter according to the related art is used to reduce a ripple of full wave rectified waveform by applying a large-capacity of aluminum electrolytic capacitor on a rear portion of a rectifier 10, thereby deteriorating a power factor due to a high capacity of capacitor, and in addition, when a large capacity of aluminum electrolytic capacitor is used, a lifespan of an LED driving circuit is reduced. Therefore, the defects caused in the related art may be solved according to embodiments of the present invention.

According to the embodiment of the present invention, voltage proportionate to the voltage V1 rectified by the rectifier 10 may be defined as reference voltage Vref, and the reference voltage may be compared to a voltage that is in proportion to current flowing through the inductor L constituting the power supply unit 30 when the switch Q1 is turned on. At this time, the switch Q1 is turned off at a coinciding timing, whereby a waveform (envelope) connecting the peaks of current flowing through the inductor L may be in proportion to the full wave rectified waveform. What the switch Q1 is turned off at the coinciding timing may be from an integrated circuit (IC) characteristic, which has been generally used in the related art, but this is different from that of the present invention in light of the point in which the reference voltage Vref in the buck converter according to the related art is not changed by time, but is uniform. Therefore, according to the related art, a waveform representing a current peak of inductor L is also uniform and an effect in improving power factor may not be obtained.

The switch controller 20 may perform a control operation to satisfy 'Toff=k*Ton', such that the current $I_1$ flowing to the light emitting unit 40 by the voltage V1 rectified in the rectifier 10 is also in proportion to the waveform of voltage V1, and a power factor may be improved. According to the related art, a switch control method is generally provided as "T=Ton+Toff=constant", and IC used for a trial product is "Toff=constant"; however, according to an embodiment of the present invention, when the driving voltage Vf of the light emitting unit 40 including LEDs is relatively very lower in comparison with a peak of the rectified voltage V1, a state in which approximately close to an equivalent value of Toff=k*Ton, is provided. In case of Toff=k*Ton, the power factor may be improved relatively more precisely.

That is, according to an embodiment of the present invention, by coinciding a waveform (envelope) connecting peaks of current flowing through the inductor L of the power supply unit 30 with a waveform of the voltage V1 outputted from the rectifier 10, the current flowing through the light emitting unit 40 may have the same type as that of an input voltage, thereby improving a power factor. In addition, the power factor may be improved by using a non-insulation type of circuit that does not have a transformer, such that the structure of circuit may be simplified and device miniaturization may be achieved, and the number of components may be reduced to efficiently and economically use an AC-DC converter as compared to a fly-back converter for improving a power factor through a feedback by using a photo coupler transferring LED current information in a state in which the LED current information has been insulated from a secondary side into a primary side.

In order to correct a power factor in a power factor correction (PFC) circuit according to the related art, the band of a feedback loop is in a range of about 10 Hz to 20 Hz so as not to be in response to 100 Hz or 120 Hz, thus a response speed is relatively slow. In addition, since this circuit has a structure of supplying power from a bleeder resistor to a control circuit at an initial voltage applying, it is not facilitated to correspond to the triac dimmer. The triac dimmer is the device for determining an illumination so as to be appropriate to a user's convenience by controlling a current supply. When general illumination products according to the related art are replaced with LED illuminators, and brightness of LED is controlled to be relatively low from an operational characteristic of the triac; flickering may occur, a circuit may not be driven, or a relatively large amount of time may be taken up with driving the circuit, which may be the reason why it is difficult to replace illuminators connected to the existing triac dimmer with LEDs.

However, according to an embodiment of the present invention, a voltage measured by current $I_L$ flowing in the inductor L through the control circuit U may be compared to the reference voltage $V_{ref}$ to decide an on or off time of the switch, and a current detection of the inductor L may be performed using only one of the third resistor R3, thereby simplifying the circuit configuration. In addition, according to the embodiment of the present invention, a response time is by a unit of microsecond or below, therefore the response may be performed relatively rapidly and momentarily. Accordingly, matching characteristics to the triac dimmer may be prominent.

Figure 7:
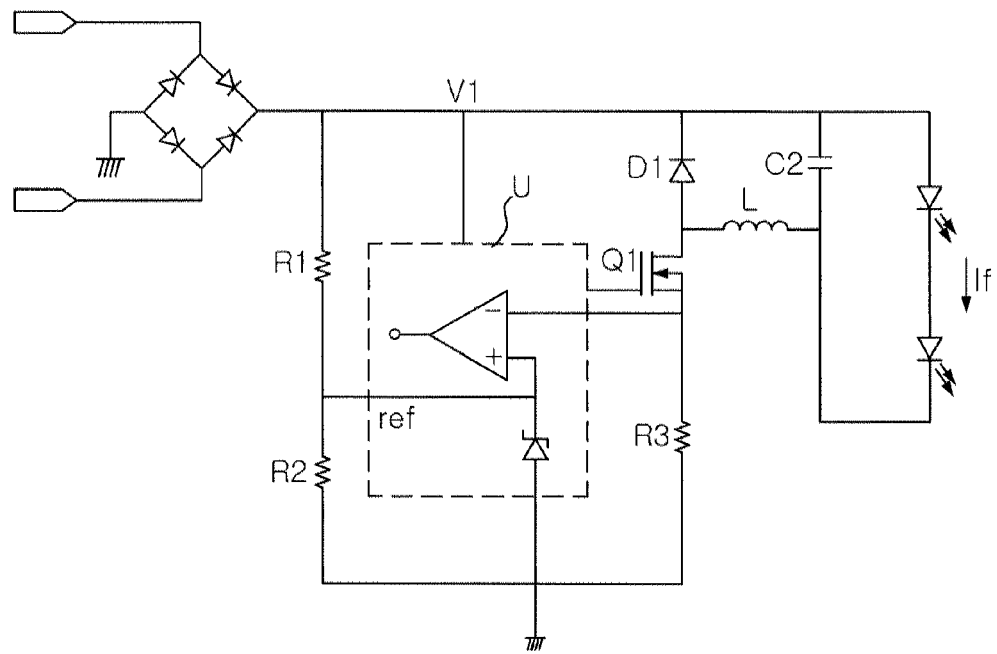
FIG. 7 is a circuit diagram of an LED driving apparatus according to another embodiment of the present invention.

According to an embodiment of the present invention, a clamp level may be set inside the control circuit U. FIG. 7 is a circuit diagram of an LED driving apparatus according to another embodiment of the present invention. With reference to FIG. 7, the control circuit U may further include a Zener diode D2 determining the clamp level in the inside thereof. One end of the zener diode D2 may be connected to a negative side of the rectifier, and another end thereof may be connected with the reference voltage Vref and the control circuit U. In the zener diode D2, when a Zener voltage of more than a predetermined value is applied thereto in an inverse direction, current flows in the inverse direction. That is, when a voltage more than a Zener voltage Vz of the zener diode Dz is applied, current flows in an inverse direction so that only a value of a clamp level or below may be input to a comparator of the control circuit U. Meanwhile, in FIG. 7, the description for circuits provided after the comparator of the input unit is omitted below.

Described in detail, when the zener voltage of the zener diode Dz is indicated as Vz, and when being $$\frac{R2}{R1+R2}V_1 < V_z,$$

it may become $$V_{ref} = \frac{R2}{R1+R2}V_1,$$

and when being $$\frac{R2}{R1+R2}V_1 > V_z,$$

it may become $V_{ref}=V_z$, such that the reference voltage $V_{ref}$ is clamped to Vz or less. At this time, since Vz may have a predetermined value regardless of an input voltage, a regulation of the light emitting unit 40 for a variation of input power may be corrected. At this time, the magnitude of clamp voltage and a clamp or non-clamp may be controlled by controlling the magnitude of first and second resistors R1 and R2. For example, when being set to become $$\frac{R2}{R1+R2}V_{1,max} < V_z,$$

the reference voltage $V_{ref}$ may have a value lower than the zener voltage Vz, therefore a clamp operation may not be performed. When the clamp level is not set, an input power voltage variation may be reflected intact to current $I_f$ flowing through the light emitting unit 40. However, in this case, the variation may be in a range of a degree at which it does not largely matter for practical purses, in a single input voltage application. The single input voltage means that it is not applied for the world wide usage in one design.

However, in order to improve an $I_f$ line regulation, a clamp level may be set inside the control circuit U. Since the clamp level may be decided from the reference voltage $V_{ref}$ regardless of the input voltage variation of the light emitting unit 40, an If regulation may be improved. Further, when the clamp level is not set, and when a peak of current $I_f$ flowing through the light emitting unit 40 excesses an absolute maximum rating current of LED, a large capacity of aluminum electrolytic capacitors should be disposed in parallel in the light emitting unit 40 to reduce a ripple in current $I_f$, but when the clamp level is set, the peak level may be also reduced for the same average current $I_f$(average) so that a small capacity of MLCC may be used for allowing an $I_f$ peak value to become lower level than the absolute maximum rating level of LED.

Accordingly, a miniaturized circuit may be manufactured and an economical effect may be provided.

Meanwhile, the magnitude of current $I_f$ flowing in the LED 41 of the light emitting unit 40 may be controlled by the third resistor R3. That is, when a value of the third resistor R3 is relatively great, the current $I_f$ flowing in the LED may become relatively small, and when the value of the third resistor R3 is relatively low, the current $I_f$ flowing in the LED may become relatively big. Here, current $I_L$ flowing in the inductor L of the power supply unit 30 may be smoothed by the capacitor C2 of the power supply unit 30 to supply the smoothed current to the light emitting unit 40. Therefore, the current $I_f$ flowing in the light emitting unit 40 may represent a current waveform smoother than the current flowing in the inductor L.

Figure 8:
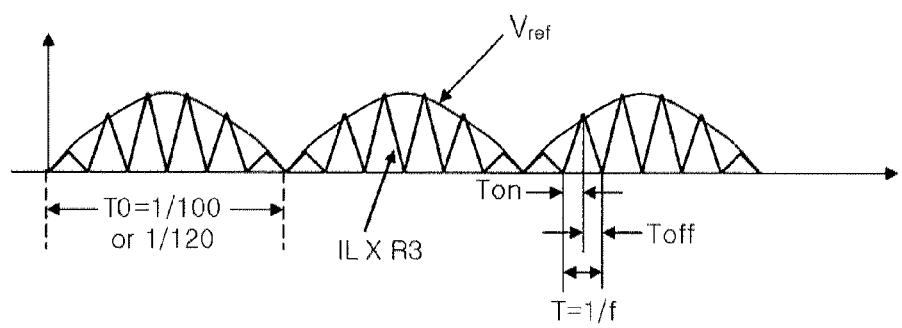
FIG. 8 is a schematic view illustrating a reference voltage waveform when a clamp is not set.

FIG. 8 is a schematic view illustrating a reference voltage waveform and a waveform of current IL flowing in the inductor L when a clamp is not set, wherein IL is indicated to be converted in a unit of voltage after a calculation of IL×R3 in order to represent a correlation with Vref. Here, in the current IL flowing in the inductor L, an off period of Q1 may be different from those of waveforms of I1 and Id shown in FIG. 6. As described above, when values of the first and second resistors R1 and R2 are set to be $$\frac{R2}{R1+R2}V_{1,max} < V_z,$$

the clamp operation may not be performed. Therefore, as shown in FIG. 8, the reference voltage $V_{ref}$ may become $$\frac{R2}{R1+R2}V_1$$

so as to be different only for the magnitude thereof from that of the voltage V1 rectified in the rectifier 10, but have similar forms of waveforms. Further, voltage inputted to the switch controller 20 may become $I_L \times R3$, in which when the switch Q1 is turned on, Id=IL, and when the switch Q1 is turned off, Id=0; and the peak thereof may have the same form of waveform as that of the reference voltage $V_{ref}$. FIG. 8 illustrates only 6 pulses for voltage $I_L \times R3$ per 1 cycle T0 of reference voltage $V_{ref}$ for an explanatory convenience, but actually, when the voltage $I_L \times R3$ is, i.e., $$\frac{1}{100k} \text{ sec},$$

and when a input voltage frequency is 50 Hz, pulses of the voltage $I_L \times R3$ per cycle of the reference voltage $V_{ref}$ may be 1000 pluses.

Figure 9:
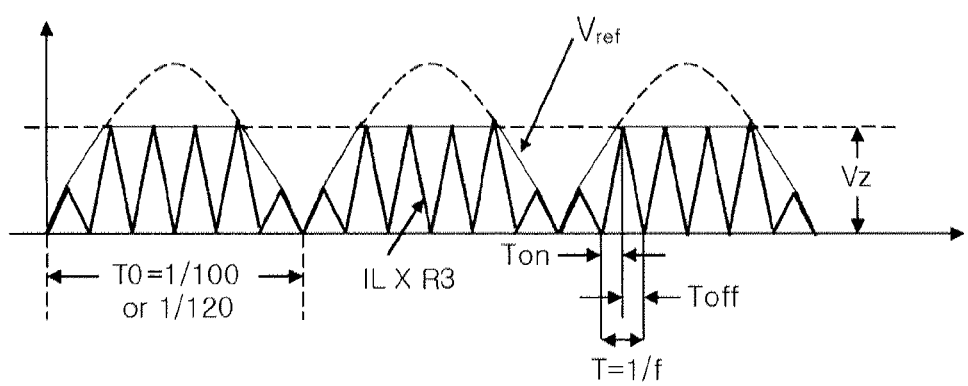
FIG. 9 is a schematic view illustrating a reference voltage waveform when a clamp is set.

FIG. 9 is a schematic view illustrating a reference voltage waveform and a waveform of current IL flowing in the inductor when a clamp is set, that is, providing the case in which the first and second resistors R1 and R2 are set to be $$\frac{R2}{R1+R2}V_{1,max} > V_z.$$

Referring to FIG. 9, at a section of satisfying $$\frac{R2}{R1+R2}V_1 < V_z,$$

it may be $$V_{ref} = \frac{R2}{R1+R2}V_1,$$

and at a section of satisfying $$\frac{R2}{R1+R2}V_1 >= V_z,$$

it may be $V_{ref}=V_z$. FIG. 9 also schematically illustrates the form of waveform like in FIG. 8 for an explanatory convenience. Actually, in a waveform of $I_L$, it may be $I_L=0$ by the diode of the rectifier 10 at a section of V1<Vf which is the section as the neighborhood of a point in which V1 is 0, but since a small portion to an overall current is used, an influence on the power factor may be relatively small. In addition, as shown in FIGS. 1 and 2, a small quantity of a capacitor C1 connected in parallel with the first and second resistors R1 and R2 may be disposed between the rectifier 10 and the switch controller 20. Therefore, the full wave rectified voltage V1 may be clamped to the voltage Vf held in the light emitting unit 40.

Figure 10:
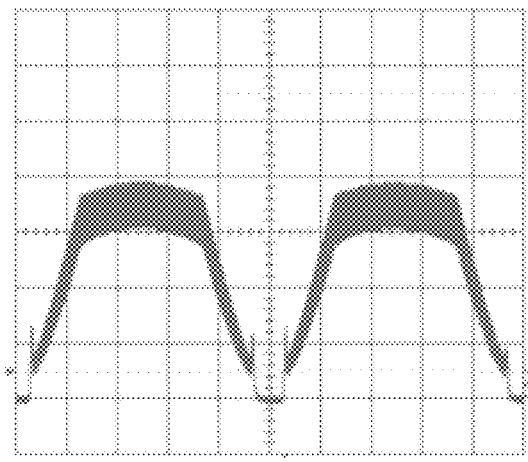
FIGS. 10 and 11 illustrate current waveforms in an LED according to an embodiment of the present invention.
Figure 11:
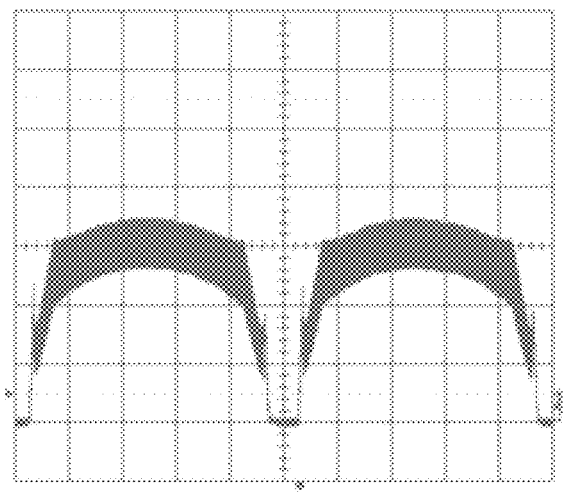

FIGS. 10 and 11 illustrate current waveforms according to an embodiment of the present invention, and described in detail, illustrate waveforms of current $I_f$ in the light emitting unit 40 including the plurality of LEDs 41 in the LED driving apparatus 100 shown in FIG. 2. At this time, Ton of the switch may be decided by comparing the input voltage $V_{ref}$ with voltage $V_{IL}$, measured by detecting the current $I_L$ flowing in the inductor L, and Toff may be constant. Further, a clamp level may be set by using the diode Dz inside the control circuit U. Referring first to FIG. 10, input external input voltage may be AC 100V, 50 Hz, an average of current $I_f$ passing through the plurality of LEDs 41 constituting the light emitting unit 40 may be 239 mA, and the voltage Vf held on the LED 41 may be 25.8V. As shown in FIG. 10, a current clamp portion represents a bit of change, but represents an overall constant level. According to an embodiment of the present invention, a circuit efficiency may be 87.5%, the regulation of the average of current If passing through the LED when AC input external voltage of AC 100V is +/−10% changed, may be +6.4% to −7.5%, and the power factor PF may be 0.91 or more.

FIG. 11 illustrates a current waveform changed for only a clamp level from the embodiment of the present invention referred to in FIG. 10. That is, similarly to the embodiment of FIG. 10, input external voltage may be AC 100V, 50 Hz, an average of current If flowing in the light emitting unit 40 may be 240 mA, and voltage Vf held on the light emitting unit 40 may be 25.9V. According to the embodiment of the present invention, the circuit efficiency may be 88.3%, and the regulation of the average of current If passing through the LED when the AC input power of AC 100V is +/−10% changed, may be +4.2% to −4.7%. That is, it can be known that the regulation of current If flowing in the LED has been improved as compared to the embodiment referred to in FIG. 10. Although the power factor PF is around 0.81 as a deteriorated level, a thirdly harmonic frequency of input current may be about 50% (86% or below in the standard) by verifying the use of EMI standard EN61000-3-2 (25 W or below) for a harmonic frequency current, and a fifth harmonic frequency current may be 23% (61% or below in the standard). Accordingly, the standard may be sufficiently satisfied.

Figure 12A:
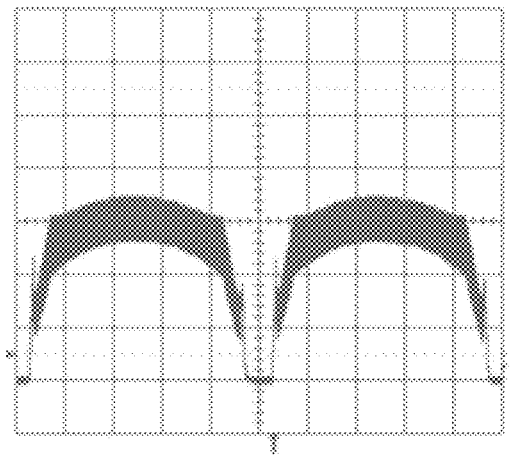
FIG. 12 illustrates a current waveform in an LED in applying an LED driving apparatus to a triac dimmer according to an embodiment of the present invention.
Figure 12B:
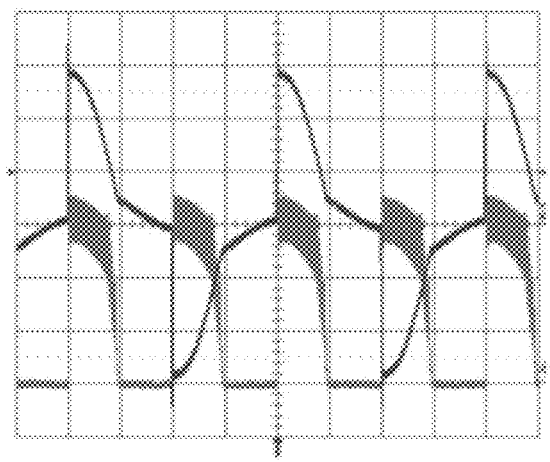

FIG. 12 illustrates a current waveform in the case in which an LED driving apparatus according to an embodiment of the present invention is applied to the triac dimmer. FIG. 12A illustrates a current waveform in a state of being not applied to the triac dimmer and FIG. 12B illustrates a current waveform in a state after applying the LED driving apparatus to the triac dimmer. A green waveform of FIG. 12B may indicate current $I_f$ flowing in the light emitting unit 40 in corresponding to the triac dimmer, and a red waveform may indicate an output voltage of the triac dimmer. According to the embodiment of the present invention, the LED driving apparatus capable of corresponding to the triac dimmer may be provided by simply adding a resistor and a capacitor on a front portion of the rectifier 10 including a bridge diode.

Figure 13:
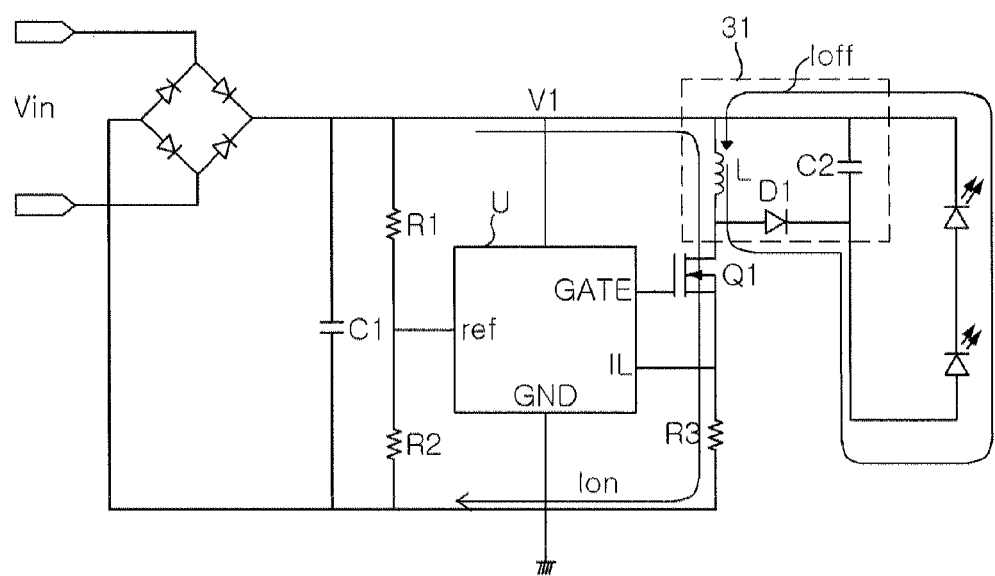
FIG. 13 is a circuit diagram of an LED driving apparatus according to another embodiment of the present invention.

FIG. 13 is a circuit diagram illustrating a current flow in an LED driving apparatus according to another embodiment of the present invention. In the embodiment described above, since the voltage supply unit 30 is basically provided as the buck converter, it may be If=0 at a section of V1<Vf, such that the power factor PF may not be 1.0 even in an ideal state; but it may be sufficient to satisfy EN61000-3-2 by 25 W or less. However, in order to more improve the power factor PF, voltage supply unit 31 may include an inversion type of buck-boost converter as shown in FIG. 13. In this case, components having a relatively high voltage specification in comparison with the buck converter may be required, but at the section of V1<Vf, that is, in all sections, the current peak of the inductor L may become in proportion to the full wave rectified waveform in the rectifier in the ideal state. So, PF is improved more.

In according to the embodiment of the present invention, as described above, the principle of improving a power factor may be to improve an IF regulation for a power voltage variation by setting a clamp level to the reference voltage Vref. Described in detail, voltage V1 full wave rectified in the rectifier is divided to provide the reference voltage Vref, and at this time, the reference voltage Vref is in proportion to a waveform of full wave rectified voltage. An off timing of the switch Q1 may be decided by converting a current IL of the inductor L into a voltage value and after that by comparing the converted voltage value with the reference voltage Vref. Waveform connecting peaks of the current IL flowing in the inductor L may be provided to have the same waveform as the full wave rectified waveform. Here, for Toff=k*Ton (k: constant), the power factor may be improved by controlling Toff, wherein Ion indicates a current flow when the switch Q1 is turned on, and Ioff indicates a current flow when the switch Q1 is turned off.

As set forth above, in an LED driving apparatus according to an embodiment of the present invention, the power factor may be improved using a non-insulation type circuit having a simplified structure.

A miniaturized device may be provided through a simplified circuit structure, and the number of components may be reduced to provide an economical and efficient LED driving apparatus.

In addition, a response time is performed relatively speedily and momentarily, thereby providing an LED driving apparatus able to correspond to a triac dimmer.

While the present invention has been shown and described in connection with the embodiments, it will be apparent to those skilled in the art that modifications and variations can be made without departing from the spirit and scope of the invention as defined by the appended claims.

What is claimed is:

1. An light emitting device (LED) driving apparatus comprising:
   a light emitting unit having at least one LED;
   a rectifier rectifying an alternate current (AC) voltage applied from external power;
   a power supply unit supplying driving power to the light emitting unit, and having an inductor connected to an output terminal of the light emitting unit;
   a switch controller receiving a voltage outputted from the rectifier to generate a reference voltage in proportion to the voltage outputted from the rectifier, and comparing the reference voltage with an input voltage generated by detecting a current flowing in the inductor, and controlling an on or off operation of a switch so as to proportion a waveform connecting peaks of the current flowing in the inductor to a waveform represented from the input voltage by turning the switch off at a point of time at which the voltages coincide with each other; and
   a switch connected to the switch controller to control power inputted from the light emitting unit.

2. The apparatus of claim 1, wherein the switch controller further includes a Zener diode connected to an input terminal of the reference voltage.

3. The apparatus of claim 1, wherein the light emitting unit includes a plurality of LEDs, the plurality of LEDs having at least one electrical connection structure of a serial connection, a parallel connection and a mixed type connection thereof.

4. The apparatus of claim 1, wherein the switch controller includes a plurality of resistors connected in series to an output terminal of the rectifier, and generates the reference voltage voltage-divided by the plurality of resistors.

5. The apparatus of claim 4, further comprising a multilayer ceramic capacitor (MLCC) or film capacitor connected to the output terminal of the rectifier and connected in parallel with the plurality of resistors.

6. The apparatus of claim 1, wherein the power supply unit further includes a diode and a capacitor.

7. The apparatus of claim 6, further comprising a current detector connected in series to the switch, the current detector being detecting the current flowing in the inductor to generate an input signal of the switch control unit.

8. The apparatus of claim 7, wherein the current detector includes a resistor of which one end is connected to the switch and another end is connected to a negative side of the rectifier.

* * * * *